United States Patent
Kotalwar et al.

(10) Patent No.: US 9,660,903 B2
(45) Date of Patent: *May 23, 2017

(54) METHOD AND SYSTEM FOR INSERTING AN OPENFLOW FLOW ENTRY INTO A FLOW TABLE USING OPENFLOW PROTOCOL

(71) Applicants: Alcatel-Lucent USA Inc., Murray Hill, NJ (US); Alcatel-Lucent Canada Inc., Ottawa (CA)

(72) Inventors: Jayant Kotalwar, Fremont, CA (US); Andrew Dolganow, Ottawa (CA); Girish Birajdar, Fremont, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 58 days.

This patent is subject to a terminal disclaimer.

(21) Appl. No.: 14/619,007

(22) Filed: Feb. 10, 2015

(65) Prior Publication Data

US 2016/0234102 A1    Aug. 11, 2016

(51) Int. Cl.
*H04L 12/715* (2013.01)
*H04L 12/755* (2013.01)
*H04L 12/721* (2013.01)
*H04L 12/851* (2013.01)

(52) U.S. Cl.
CPC ............ *H04L 45/38* (2013.01); *H04L 45/021* (2013.01); *H04L 45/64* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 2012/0044935 A1 | 2/2012 | Hama et al. | |
| 2012/0300615 A1 | 11/2012 | Kempf et al. | |
| 2013/0010600 A1* | 1/2013 | Jocha | H04L 43/026 370/236.2 |
| 2013/0272135 A1 | 10/2013 | Leong | |
| 2014/0146674 A1 | 5/2014 | Wang et al. | |
| 2014/0241247 A1 | 8/2014 | Kempf et al. | |
| 2015/0009831 A1 | 1/2015 | Graf | |
| 2015/0188770 A1 | 7/2015 | Naiksatam et al. | |
| 2015/0319094 A1* | 11/2015 | Brockbank | H04L 47/2483 370/216 |
| 2015/0381428 A1 | 12/2015 | Ong | |
| 2016/0065454 A1* | 3/2016 | Arumugam | H04L 45/38 370/389 |
| 2016/0112328 A1* | 4/2016 | Anand | H04L 47/22 370/236.2 |

* cited by examiner

*Primary Examiner* — Diane Lo
(74) *Attorney, Agent, or Firm* — Wilson & Ham

(57) ABSTRACT

A method for inserting an OpenFlow flow entry into a flow table is disclosed. In the embodiment, the method involves receiving a flow mod message at an OpenFlow-enabled switch, the flow mod message including a cookie field, decoding an OpenFlow flow entry from the flow mod message, identifying a flow table from the cookie field, and inserting the decoded flow entry into the flow table.

20 Claims, 8 Drawing Sheets

| COOKIE NAME | COOKIE TYPE (BITS 63...60) | COOKIE VALUE (64 BITS: 63...0) | COOKIE USAGE |
|---|---|---|---|
| GRT (GLOBAL ROUTING TABLE) | 0000 (HEX 0x0) | 0x0000FFFF 00112233 | FLOW ENTRY FOR GLOBAL ROUTING INSTANCE. |
| SYSTEM | 1000 (HEX 0x8) | 0x8000FFFF 00112233 | FLOW ENTRY FOR SYSTEM (i.e. ALL INSTANCES) |
| SERVICE | 1100 (HEX 0xC) | 0xC0001001 00112233 | FLOW ENTRY FOR SERVICE INSTANCE IDENTIFIED BY COOKIE BIT 59-32 (I.E. 0x0001001). |
| SERVICE | 1100 (HEX 0xC) | 0xC0004422 00112233 | FLOW ENTRY FOR SERVICE INSTANCE IDENTIFIED BY COOKIE BIT 59-32 (I.E. 0x0004422). |

FIG. 5

METHOD AND SYSTEM FOR INSERTING AN OPENFLOW FLOW ENTRY INTO A FLOW TABLE USING OPENFLOW PROTOCOL

BACKGROUND

OpenFlow-based software-defined networks (SDNs) represent a paradigm shift in network architecture that provides improved switching and flexibility. Accordingly, many traditional network architectures are being replaced with SDN architectures. However, adoption of SDNs in place of traditional networks can be a slow and costly process because, for example, traditional networks and SDNs are not able to fully communicate with each other and packets routed over an SDN pipeline are not easily passed off to a traditional network pipeline and vice versa. In order to reduce cost and expedite the adoption of SDNs, Hybrid OpenFlow switches have been introduced as a means to facilitate communication between traditional network switches and SDN switches, allowing for more immediate adoption of SDN architectures. However, some functionality of traditional network switches cannot be managed using Hybrid OpenFlow, as currently defined by the OpenFlow protocol.

SUMMARY

In an embodiment, a method for inserting an OpenFlow flow entry into a flow table is disclosed. In the embodiment, the method involves receiving a flow mod message at an OpenFlow-enabled switch, the flow mod message including a cookie field, decoding an OpenFlow flow entry from the flow mod message, identifying a flow table from the cookie field, and inserting the decoded flow entry into the flow table.

In another embodiment, a non-transitory computer-readable storage medium is disclosed. In an embodiment, the non-transitory computer-readable storage medium comprises instructions, which when executed by at least one processor, implement a method for inserting an OpenFlow flow entry into a flow table using OpenFlow protocol. The method involves receiving a flow mod message at an OpenFlow-enabled switch, the flow mod message including a cookie field, decoding an OpenFlow flow entry from the flow mod message, identifying a flow table from the cookie field, and inserting the decoded flow entry into the identified flow table.

In another embodiment, an OpenFlow-enabled switch is disclosed. The OpenFlow-enabled switch includes an OpenFlow client that is configured to receive a flow mod message, the flow mod message including a cookie field, to decode an OpenFlow flow entry from the flow mod message, to identify a flow table from the cookie field, and to insert the decoded OpenFlow flow entry into the identified flow table.

Other aspects and advantages of embodiments of the present invention will become apparent from the following detailed description taken in conjunction with the accompanying drawings.

BRIEF DESCRIPTION OF THE DRAWINGS

FIG. 5 is a table of cookies used to indicate into which flow table an OpenFlow flow entry should be inserted in accordance with an embodiment of the invention.

Throughout the description, similar reference numbers may be used to identify similar elements.

DETAILED DESCRIPTION

Figure 1:
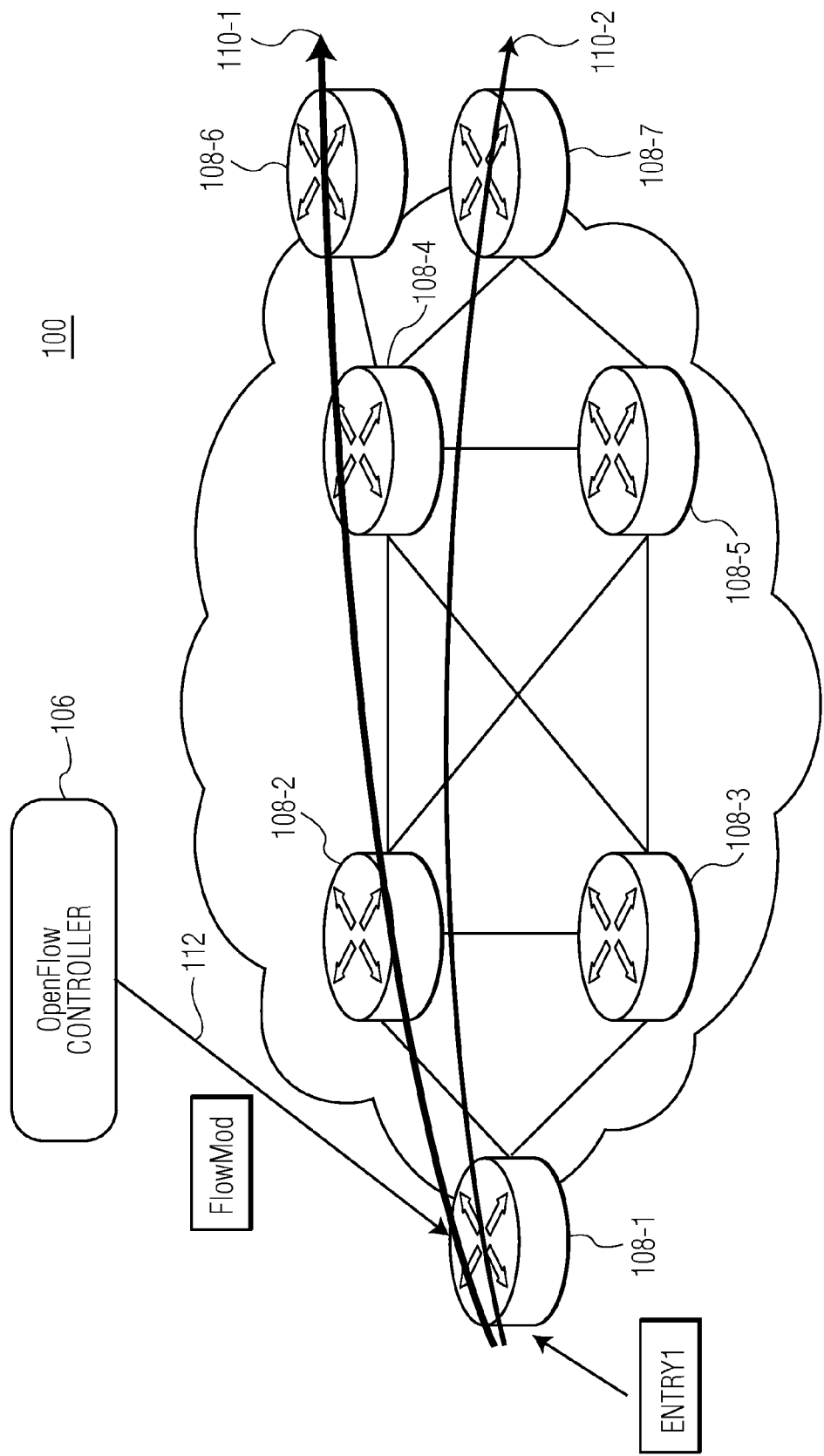
FIG. 1 depicts an SDN.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Traditional network architectures typically utilize hierarchical tiers of switches to switch packets through a network using various network protocols. The configuration of networks using traditional network architectures (traditional networks) is typically static and reconfiguration of the traditional networks involves reconfiguring each switch individually in the traditional network. Thus, considerable effort is required to reconfigure a traditional network.

In contrast, software-defined network (SDN) architectures utilize centralized controllers to direct switching of packets across switches in the SDN. The centralized nature of the controller allows for reconfiguration of the SDN by reconfiguring rules of the controller and allowing the controller to update the switching/routing behavior without having to individually reconfigure each switch in the network as well. Thus, reconfiguring an SDN requires considerably less effort than reconfiguring a traditional network. Since less effort is needed to reconfigure, and thus manage, an SDN, SDNs are replacing many traditional networks. Typically, replacing a traditional network with an SDN requires replacing traditional switches with pure OpenFlow switches. Replacing all traditional switches in a traditional network at once can be costly and, thus, solutions that allow for unified management of both pure OpenFlow switches and traditional network switches while the traditional network switches are gradually replaced with pure OpenFlow switches are desirable.

FIG. 1 depicts an SDN 100. In the embodiment of FIG. 1, the SDN includes an OpenFlow controller 106 and OpenFlow-enabled switches 108-1-108-7. In an embodiment, OpenFlow-enabled are switches that can support OpenFlow protocol and include an OpenFlow client (not shown). In an embodiment, the OpenFlow-enabled switches can be pure OpenFlow switches (physical or virtual) or OpenFlow-hybrid switches (physical). The controller can be configured to direct the OpenFlow-enabled switches to facilitate service instances 110-1, 110-2 between edge switches (e.g., switches connected to networks outside of the SDN) across the SDN. In an embodiment, service instances are a collection of parameters such as routing tables, interfaces, and routing protocol parameters that can be used to virtually partition a network device in order to provide network privacy. For example, virtual private networks (VPNs), virtual LANs (VLANs), and virtual private LAN services (VPLS) are service instances. The OpenFlow-enabled switches include one or more flow tables (not shown) and a group table (not shown). In an embodiment, a flow table is a table of flow entries that is maintained on an Openflow-enabled switch, the flow entries defined by match fields and a priority level, against which received packets are matched. The flow table can be divided into a "system flow table" and "service flow tables" by assigning flow entries to be included in the system flow table priority levels that will cause the system flow table entries to be applied first when matching is performed, and by applying jump instructions to packets so that matching is only performed against a particular service flow table. Pure OpenFlow switches can forward packets through a network by matching a packet with entries in the one or more flow tables. OpenFlow-hybrid switches can forward packets through a network either using OpenFlow switching by matching a packet with entries in the one or more flow tables or using traditional layer 2/layer 3 switching and routing functionality of the switch. In the embodiment of FIG. 1, the OpenFlow-enabled switches are interconnected with each other and each OpenFlow-enabled switch is further connected to the controller via a secure channel 112 (illustrated just for switch 108-1), which allows for centralized management and configuration of the SDN. When an SDN is configured or re-configured, the controller sends "flow mod messages" to the OpenFlow-enabled switches that direct the OpenFlow-enabled switches to add flow entries to flow tables (not shown) stored on each OpenFlow-enabled switch. For example, when configuring an SDN to route packets from a flow along a defined path, the controller sends messages to each of the OpenFlow-enabled switches along the defined path. The messages direct the switches to add flow entries to their flow tables that will cause packets from the flow to be forwarded along the defined path. Thus, OpenFlow-enabled switches in an SDN can be centrally configured and re-configured through the controller, rather than manually configuring or re-configuring each individual OpenFlow-enabled switch.

Figure 2:
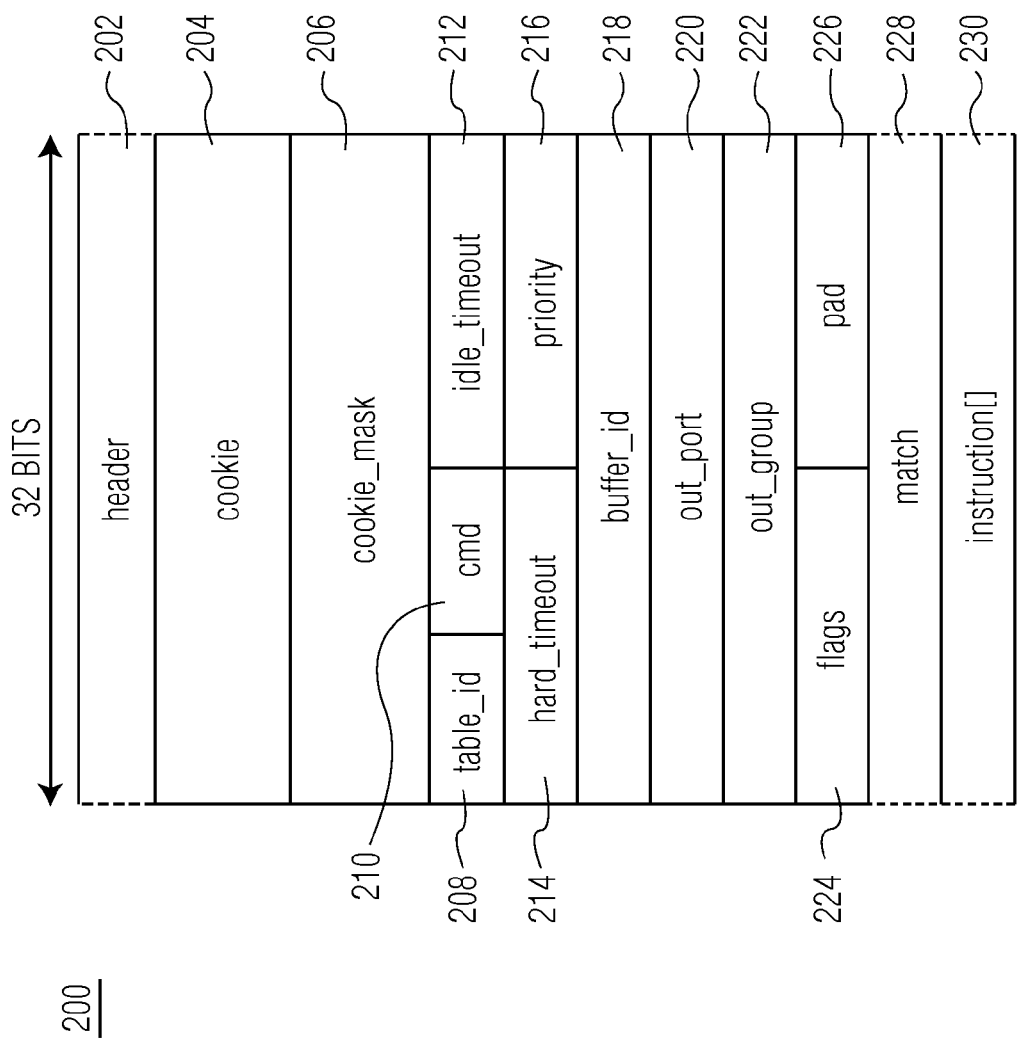
FIG. 2 illustrates the format of a flow mod message in accordance with OpenFlow protocol.

FIG. 2 illustrates the format of a flow mod message 200 in accordance with Version 1.3.1 of the OpenFlow protocol (published by the Open Networking Foundation on Sep. 6, 2012). As illustrated, the message begins with a standard header field 202 and is followed by a cookie field 204, a cookie_mask field 206, a table_id field 208, a cmd field 210, an idle_timeout field 212, a hard_timeout field 214, a priority field 216, a buffer_id field 218, an out_port field 220, an out_group field 222, a flags field 224, a padding field 226, a match field 228, and an instruction set field 230. The header field, match field, and the instruction set field are indicated with dotted lines to illustrate that the capacity of the fields can expand as needed to accommodate entries in the fields.

Figure 3:
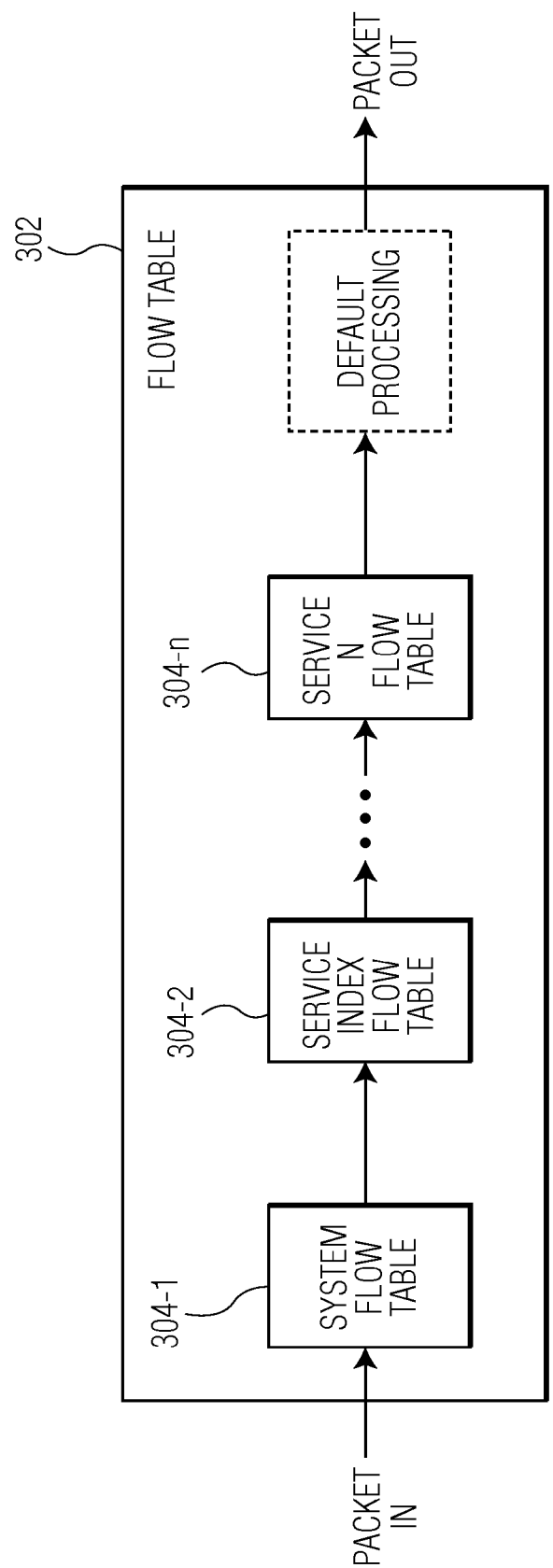
FIG. 3 illustrates a process by which an OpenFlow-enabled switch determines if a packet matches a flow entry in a flow table.

FIG. 3 illustrates a process by which an OpenFlow-enabled switch determines if a packet matches a flow entry in a flow table. In an embodiment, a flow table 302 may include several sequentially numbered sub-tables 304-1-304-n and each sub-table includes several flow entries (not shown). When a packet is received by an OpenFlow-enabled switch for processing, an OpenFlow client on the OpenFlow-enabled switch extracts information from the packet and generates a match field for the packet by encoding the extracted information using the OXM format. The match field for the packet is then compared with the match fields of flow entries in the flow table, starting with entries in the system flow table. Depending on the outcome of the comparisons, the match field of the packet may be compared to match fields of flow entries in service flow tables. If the match field of the packet matches the match fields of a flow entry in the system flow table or a service flow table, then actions or instructions associated with the flow entry may be performed on the packet. Instructions include, for example, manipulations that result in changes to the packet, changes to an action set of the packet, or changes to the processing of the packet (e.g., jump ahead by five sub-tables) and actions include, for example, packet manipulations (e.g., forward the packet to outgoing port 80) as defined by version 1.3.1 of the OpenFlow protocol. In the embodiment of FIG. 3, a packet flows into the OpenFlow-enabled switch through an ingress port with an empty set of actions and the OpenFlow-enabled switch begins performing comparisons between the packet and flow entries, starting with flow entries in the lowest numbered sub-table (table 302-1). In an embodiment, if no matching flow entry is found, the switch is configured to continue searching the next sub-table (e.g., table 302-2) for a match. The switch continues searching sub-table flow entries until a matching flow entry is found and, once the matching flow entry is found, instructions and actions associated with the flow entry are performed on the packet. Once the instructions (e.g., jump to a subsequent table and continue searching for a matching flow entry) and actions (e.g., set a header field of the packet) have been performed on the packet, the packet is forwarded to an outgoing port. If no actions are associated with the packet or if no matching flow entry is found, the packet is processed with default processing. In an embodiment, default processing can be to either forward a packet to an OpenFlow controller so that a routing decision can be made (e.g., drop the packet or define a new path along which the packet should be forwarded) or the packet can be processed using standard layer 2/layer 3 switching. In an embodiment, the sub-tables can be configured as part of a system flow table or as part of service flow tables. Flow entries in sub-tables that are part of the system flow table are applied to all packets received by the OpenFlow-enabled switch, while flow entries in sub-tables part of each service flow table are only applied to packets that are received on a corresponding service. Accordingly, if a flow entry should be applied to all service instances, the flow entry can be added to the system flow table once rather than being added to a flow table for each service instance (e.g., added multiple times). Thus, a flow table can be more efficiently scaled to facilitate steering of generic traffic or implementing firewall rules. So configured, when a packet flows into the OpenFlow-enabled switch, the flow entries in the system flow table are matched against the packet. In an embodiment, if no match is found or if the packet is not dropped, then matching continues with the service flow tables. As illustrated in FIG. 3, the service flow tables are implemented with a service index flow table and several service-specific sub-tables. Accordingly, a packet is first matched against an index and instructed (for example, by an instruction associated with a flow entry in the index that matches the packet) to jump to a particular service-specific sub-table where the packet is matched against entries in the particular service-specific sub-table. In an embodiment, if no match is found in the particular service-specific sub-table, then the OpenFlow-enabled switch can forward the packet up to an OpenFlow controller for further processing or can process the packet using layer 2/layer 3 switching.

Using flow mod messages, the controller can direct OpenFlow-enabled switches to add flow entries to their flow tables. However, a message from a controller to an OpenFlow-enabled switch, as defined by version 1.3.1 and other versions of OpenFlow protocol, does not directly support indicating into which flow table (e.g., the system flow table or a particular service flow table) an OpenFlow flow entry should be inserted. Accordingly, the lack of direct support for the insertion of flow entries into the appropriate flow table (e.g., a service flow table or the system flow table) can frustrate the effective management of an SDN using OpenFlow protocol because a specific flow table into which a flow entry is to be inserted cannot be specified.

In accordance with an embodiment of the invention, a method for inserting an OpenFlow flow entry into a flow table using OpenFlow protocol is disclosed. In an embodiment, the method involves receiving a flow mod message at an OpenFlow-enabled switch, the flow mod message including a cookie field, decoding an OpenFlow flow entry from the flow mod message, identifying a flow table from the cookie field, and inserting the decoded OpenFlow flow entry into the flow table. Thus, a flow mod message can be communicated from a controller to an OpenFlow-enabled switch and an OpenFlow flow entry can be specified for insertion into a system flow table using OpenFlow protocol.

Figure 4:
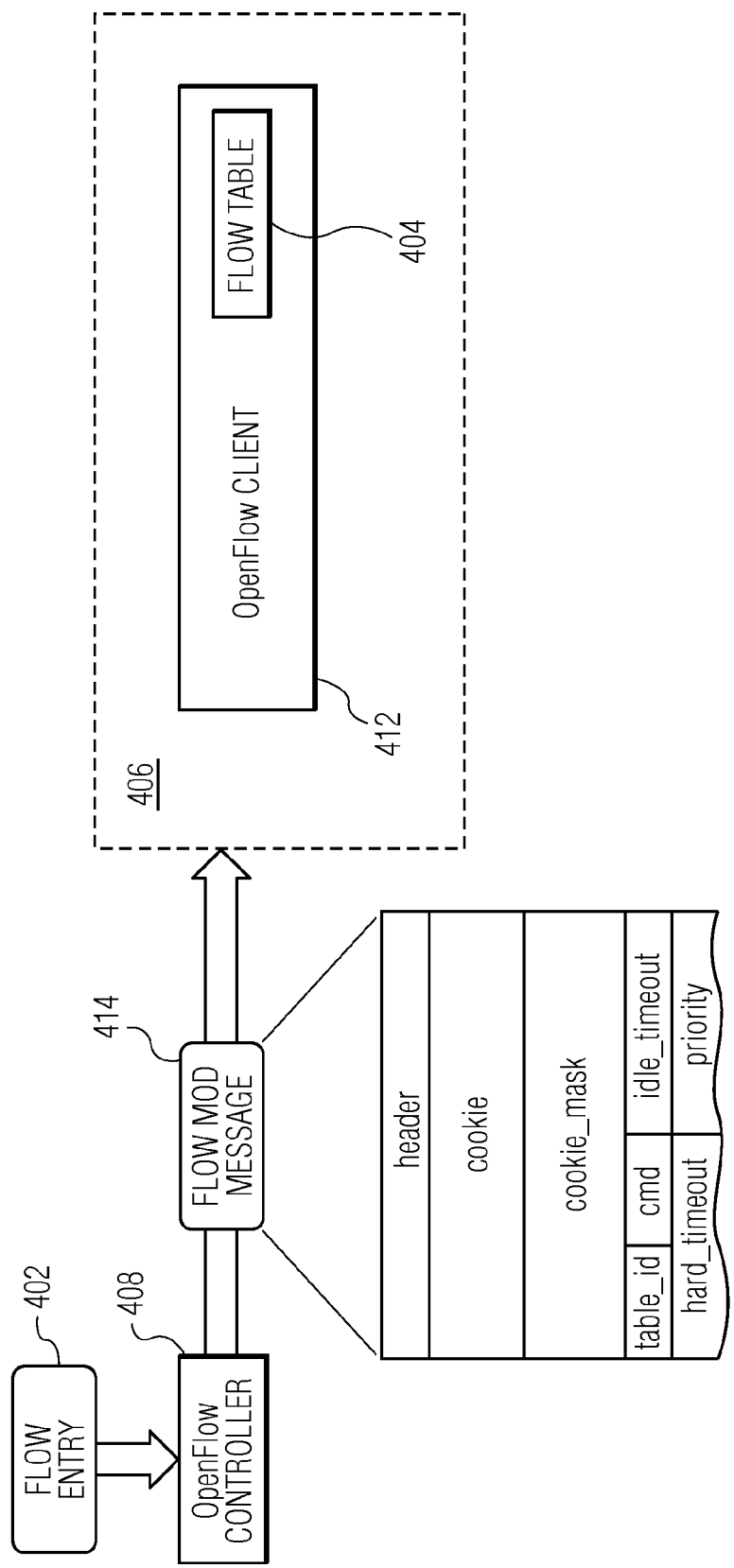
FIG. 4 illustrates an embodiment of a process by which an OpenFlow flow entry is inserted into a flow table on an OpenFlow-enabled switch.

FIG. 4 illustrates an embodiment of a process by which an OpenFlow flow entry 402 is inserted into a flow table 404 on an OpenFlow-enabled switch 406. In the embodiment illustrated in FIG. 4, the process for inserting the OpenFlow flow entry involves an OpenFlow controller 408 and the OpenFlow-enabled switch. The OpenFlow-enabled switch runs an OpenFlow Client 412 that interfaces with the OpenFlow controller. When a new flow entry needs to be inserted into a flow table on an OpenFlow-enabled switch, such as a flow entry to blacklist packets from an attacker IP address, to configure a firewall, or to block a network sniffer/scanner or DDOS attack, the new flow entry is created at the OpenFlow controller and encoded in a flow mod message. In an embodiment, the OpenFlow controller uses bits from the cookie field to indicate the type of flow entry (described below with reference to FIG. 5) encoded in the flow mod message and uses the subsequent fields of the flow mod message (e.g., the match field or the instructions field) to indicate additional information needed for the flow entry. In an embodiment, the additional information can be encoded in the subsequent fields using match fields and actions defined by the OpenFlow specification, as described in the co-filed application entitled "METHOD AND SYSTEM FOR IDENTIFYING AN INCOMING INTERFACE USING OPENFLOW PROTOCOL," having Ser. No. 14/618,994. In an embodiment, bits from the cookie field can also be used to indicate additional information. As illustrated in FIG. 4, such an encoded flow mod message 414 is then sent to the OpenFlow-enabled switch. In an embodiment, the OpenFlow client on the OpenFlow-enabled switch is configured to receive the flow mod message and to decode a flow entry from the flow mod message. Once the flow entry is decoded from the flow mod message, the OpenFlow client processes the cookie field of the flow mod message and inserts the flow entry into the appropriate flow table (e.g., a system flow table or a service flow table as indicated by data in the cookie field). For example, when the cookie field of a flow mod message that encodes a flow entry for blacklisting packets from an attacker IP address is processed, the cookie field will indicate that the flow entry should be injected into a system flow table.

FIG. 5 is a table of cookies 500 that are used to indicate into which flow table an OpenFlow flow entry should be inserted. In an embodiment, cookies can encode a flow entry for a global routing instance (global cookie), for an entire switch or system (system cookie), or for a specific service instance (service cookie). In accordance with version 1.3.1 of the OpenFlow specification, the cookie field is a 64-bit field. In an embodiment, in addition to indicating where the flow entry should be inserted, bits 60-63 are used to indicate the type of the cookie (i.e., a global, system, or service cookie) and bits 0-59 can be used to encode additional information. For example, in global or system cookies, the bits can be used to identify a service instance ID in a lookup table (e.g., bits 60-63 equal "4097" which corresponds to VLAN 1), while, in service cookies, the bits can be used to identify a specific service instance (e.g., VLAN 1 or VPN 3). In the table 500 of FIG. 5, the first entry 502 is an example of a global cookie, as indicated by the value "0000" in bits 60-63, the second entry 504 is an example of a system cookie, as indicated by the value "1000" in bits 60-63, and the last two entries 506, 508 are service cookies, as indicated by the value "1100" in bits 60-63. In the embodiment of FIG. 5, bits 32-59 in a service cookie are used to identify a service instance, while global cookies and system cookies are service agnostic. For example, a flow entry that should only be matched against packets received on a certain service instance is encoded in a flow mod message with a service cookie that identifies the certain service instance. Alternatively, a flow entry that should affect all service instances and should be matched against packets without identifying a certain service instance is encoded in a flow mod message with a global cookie or a system cookie. In other embodiments, other various types of flow entries can be encoded in flow mod messages with a cookie using various other bit configurations. For example, bit ranges other than bits 60-63 can be used to encode a cookie and the above-described technique can be implemented without using all 64 bits of the cookie field.

Figure 6:
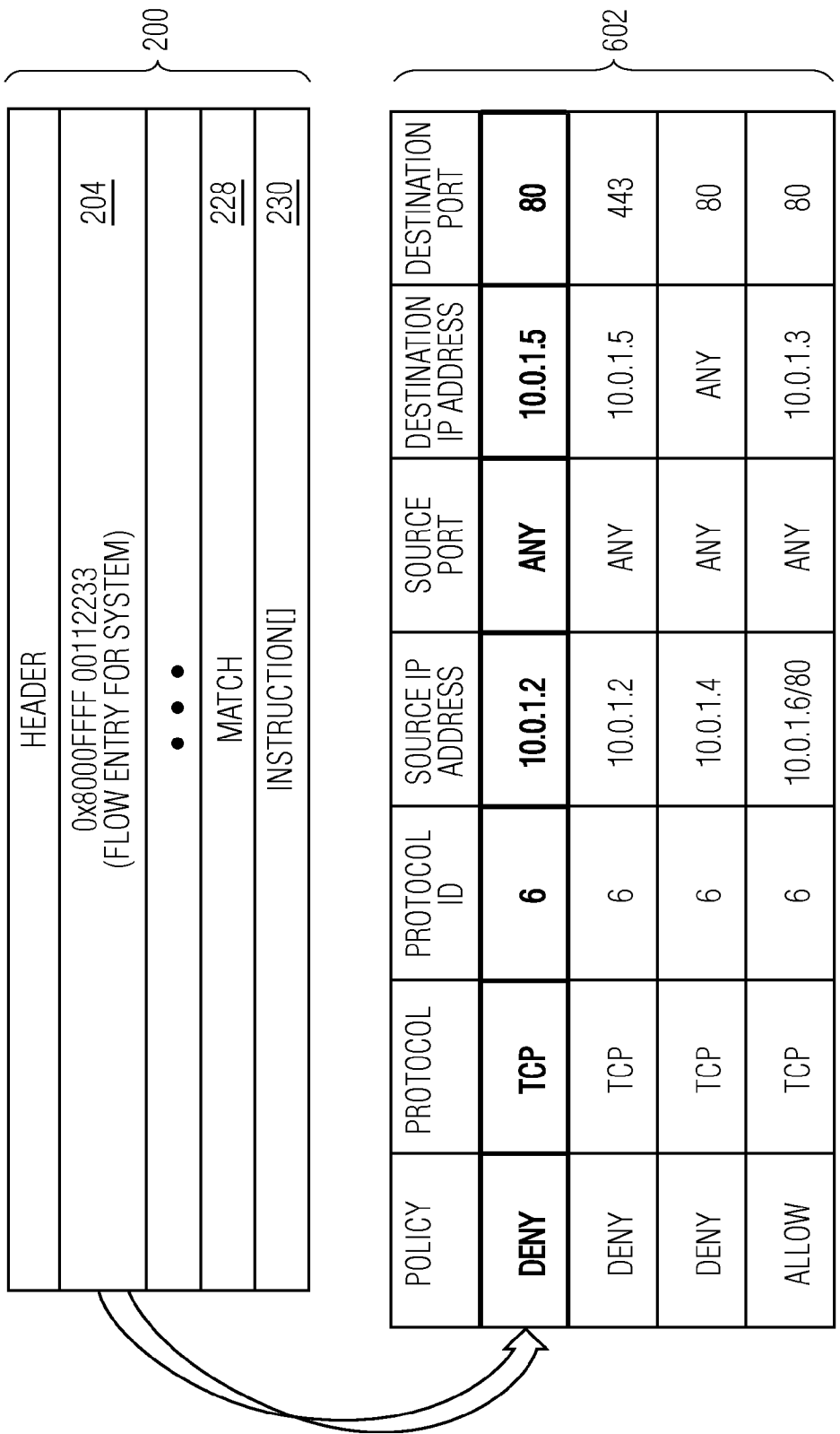
FIG. 6 illustrates the insertion of an OpenFlow flow entry into a system flow table in accordance with an embodiment of the invention.

In an embodiment, when an OpenFlow-enabled switch receives a flow mod message, an OpenFlow client on the OpenFlow-enabled switch is configured to decode an OpenFlow flow entry from the flow mod message, identify a system flow table from the cookie field of the flow mod message, and insert the flow entry into the system flow table. FIG. 6 illustrates the insertion of an OpenFlow flow entry 200 into a system flow table 602 in accordance with an embodiment of the invention. As illustrated, the cookie field 204 of the flow mod message carries a system cookie. When the OpenFlow-enabled switch decodes the flow mod message and processes the cookie field, the OpenFlow-enabled switch determines that the flow entry should be inserted into a system flow table and creates an entry in the system flow table, as indicated by the arrow. In an embodiment, the entry is inserted into the system flow table by populating the entry, for example, using information in the match field 228 and the instructions field 230 and adding the populated entry to a list of entries in the system flow table.

Figure 7:
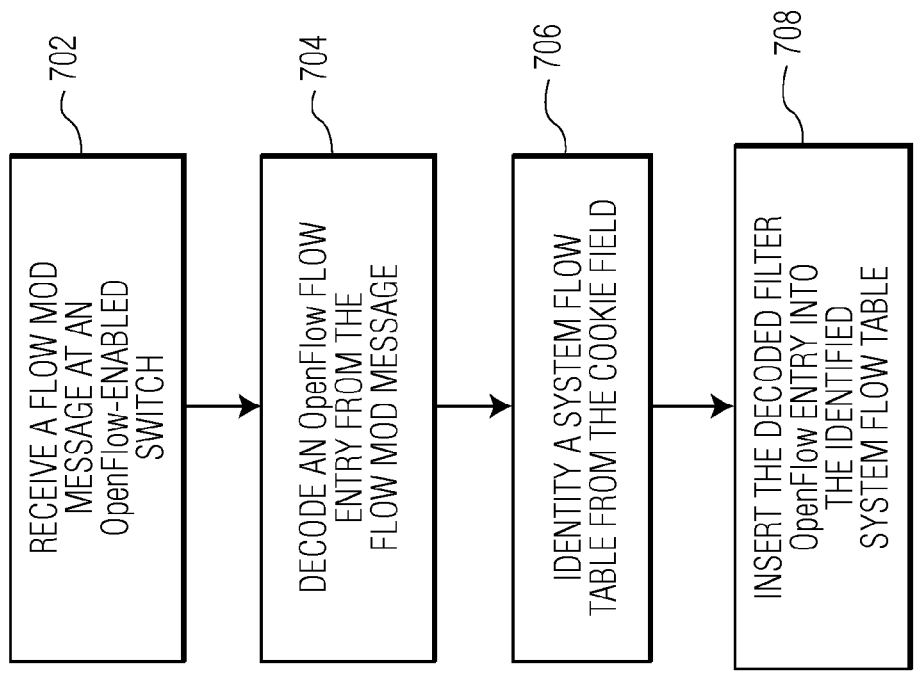
FIG. 7 is a flow chart diagram of a method for inserting an OpenFlow flow entry into a system flow table using OpenFlow protocol in accordance with an embodiment of the invention.

FIG. 7 is a flow chart diagram of a method for inserting an OpenFlow flow entry into a system flow table in accordance with an embodiment of the invention. At block 702, a flow mod message is received at an OpenFlow-enabled switch. In an embodiment, the flow mod message is received from an OpenFlow controller and includes a cookie field as specified by OpenFlow protocol. At block 704, an OpenFlow flow entry is decoded from the flow mod message. In an embodiment, the flow entry is decoded by an OpenFlow client running on the OpenFlow-enabled switch. At block 706, a system flow table is identified from the cookie field. In an embodiment, the system flow table is identified as described above with reference to FIG. 5. At block 708, once the system flow table is identified, the decoded OpenFlow entry is inserted into the identified system flow table.

Figure 8:
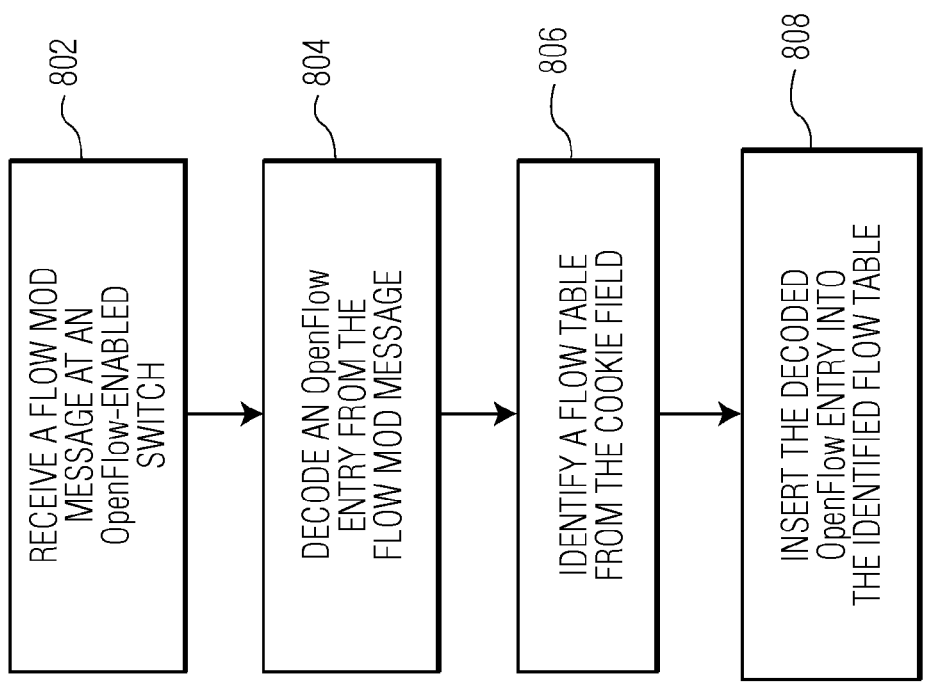
FIG. 8 is a flow chart diagram of a method for inserting an OpenFlow flow entry into a flow table using OpenFlow protocol in accordance with an embodiment of the invention.

FIG. 8 is a flow chart diagram of a method for inserting an OpenFlow flow entry into a flow table in accordance with an embodiment of the invention. At block 802, a flow mod message is received at an OpenFlow-enabled switch. In an embodiment, the flow mod message is received from an OpenFlow controller and includes a cookie field as specified by OpenFlow protocol. At block 804, an OpenFlow flow entry is decoded from the flow mod message. In an embodiment, the flow entry is decoded by an OpenFlow client running on the OpenFlow-enabled switch. At block 806, a flow table is identified from the cookie field. In an embodiment, the flow table can be a system flow table, as described above with reference to FIG. 5, or a service flow table. At block 808, once the flow table is identified, the decoded OpenFlow entry is inserted into the identified flow table.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Although Version 1.3.1 of the OpenFlow protocol is described, the above-described technique can be applied to SDNs using other versions (e.g., earlier or later versions) of the OpenFlow protocol or other SDN protocols.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein. In an embodiment, the above-described OpenFlow-switches and OpenFlow controller can include one or more computers that include at least one processor, memory, and a communication interface.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for inserting an OpenFlow flow entry into a flow table using OpenFlow protocol, the method comprising:

receiving a flow mod message at an OpenFlow-enabled switch, the flow mod message including a cookie field;

decoding an OpenFlow flow entry from the flow mod message;

identifying a flow table from the cookie field; and inserting the decoded flow entry into the identified flow table.

2. The method of claim 1, wherein the flow table is a system flow table.

3. The method of claim 1, wherein the OpenFlow flow entry is decoded from at least one of the cookie field and additional fields of the flow mod message.

4. The method of claim 1, wherein the OpenFlow flow entry is for a global routing service instance.

5. The method of claim 1, wherein the OpenFlow flow entry is for all service instances facilitated across a software defined network.

6. The method of claim 1, wherein at least some bits from the cookie field indicate a type of OpenFlow flow entry encoded in the flow mod message.

7. The method of claim 6, wherein at least some bits from the cookie field indicate additional information of the OpenFlow flow entry.

8. A non-transitory computer-readable storage medium that stores computer readable instructions, which when executed by at least one processor, implement a method for inserting an OpenFlow flow entry into a flow table using OpenFlow protocol, the method comprising:
   receiving a flow mod message at an OpenFlow-enabled switch, the flow mod message including a cookie field;
   decoding an OpenFlow flow entry from the flow mod message;
   identifying a flow table from the cookie field; and
   inserting the decoded flow entry into the identified flow table.

9. The non-transitory computer-readable storage medium of claim 8, wherein the flow table is a system flow table.

10. The non-transitory computer-readable storage medium of claim 8, wherein the OpenFlow flow entry is decoded from at least one of the cookie field and additional fields of the flow mod message.

11. The non-transitory computer-readable storage medium of claim 8, wherein the OpenFlow flow entry is for a global routing service instance.

12. The non-transitory computer-readable storage medium of claim 8, wherein at least some bits from the cookie field indicate a type of OpenFlow flow entry encoded in the flow mod message.

13. The non-transitory computer-readable storage medium of claim 12, wherein at least some bits from the cookie field indicate additional information of the OpenFlow flow entry.

14. An OpenFlow-enabled switch, the OpenFlow-enabled switch comprising:
   an OpenFlow client configured to:
      receive a flow mod message, the flow mod message including a cookie field;
      decode an OpenFlow flow entry from the flow mod message;
      identify a flow table from the cookie field; and
      insert the decoded OpenFlow flow entry into the identified flow table.

15. The OpenFlow-enabled switch of claim 14, wherein the flow table is a system flow table.

16. The OpenFlow-enabled switch of claim 14, wherein the OpenFlow flow entry is decoded from at least one of the cookie field and additional fields of the flow mod message.

17. The OpenFlow-enabled switch of claim 14, wherein the OpenFlow flow entry is for a global routing service instance.

18. The OpenFlow-enabled switch of claim 14, wherein the OpenFlow flow entry is for a service instance identified by bits of the cookie field.

19. The OpenFlow-enabled switch of claim 14, wherein the OpenFlow flow entry is for all service instances across an SDN.

20. The OpenFlow-enabled switch of claim 14, wherein the cookie field is divided into a first range of bits indicating a type of OpenFlow flow entry encoded in the flow mod message and a second range of bits indicating additional information of the OpenFlow flow entry.

* * * * *